United States Patent [19]

Ferland

[11] Patent Number: 5,775,678
[45] Date of Patent: Jul. 7, 1998

[54] EYE GLASS REPAIR TOOL

[76] Inventor: Serge Ferland, 85 Killoran, Drummondville, Quebec, Canada, J2C 1J1

[21] Appl. No.: 586,188
[22] PCT Filed: Jul. 11, 1994
[86] PCT No.: PCT/CA94/00348
 § 371 Date: Jan. 16, 1996
 § 102(e) Date: Jan. 16, 1996
[87] PCT Pub. No.: WO95/02844
 PCT Pub. Date: Jan. 25, 1995

[30] Foreign Application Priority Data

Dec. 7, 1993 [GB] United Kingdom ............. 9314369

[51] Int. Cl.⁶ .................................................. B25B 1/20
[52] U.S. Cl. ........................... 269/3; 269/6; 269/131; 269/202
[58] Field of Search ........................ 269/3, 6, 130, 269/131, 132, 166, 171.5, 202, 210, 909

[56] References Cited

U.S. PATENT DOCUMENTS

| | | | |
|---|---|---|---|
| 433,973 | 8/1890 | Armstrong | 269/202 |
| 1,277,324 | 8/1918 | Larsson | 269/202 |
| 1,812,096 | 6/1931 | Jameson | 269/202 |
| 1,897,644 | 2/1933 | Rothamel | 269/130 |
| 2,427,353 | 9/1947 | Gagesteyn | 269/132 |
| 2,451,702 | 10/1948 | Weigand | 269/131 |
| 4,171,799 | 10/1979 | Elko | 269/108 |
| 4,527,784 | 7/1985 | Schwab | 269/130 |

FOREIGN PATENT DOCUMENTS

| | | | |
|---|---|---|---|
| 275443 | 7/1988 | European Pat. Off. | 269/131 |
| 7869 | 4/1893 | United Kingdom | 269/3 |

*Primary Examiner*—Robert C. Watson
*Attorney, Agent, or Firm*—Eric Fincham

[57] ABSTRACT

There is provided a multi purpose tool to assist in the repair and adjustment of eye glasses, the tool having a body portion and clamping member moveable into and out of a clamping relationship with the body, the clamping member being a wire like member. The tool is particularly useful for mounting the flexible type of temple having a spring member onto the main body of the eyeglass.

7 Claims, 9 Drawing Sheets

EYE GLASS REPAIR TOOL

The present invention relates to a tool or implement and more particularly, relates to a tool or implement for use in repairing eye glasses.

The repair and adjustment of eye glasses is well known in the art and practiced by most opticians and optometrists. Most eye glasses comprise a frame having the lenses retained therein, nose pieces being secured to the frame by means of screws, and legs or temples attached to the frame at the end piece, also by means of screws.

The process of attachment of the temples to the frame consists of placing in registry apertures in both the frame and temple and inserting a screw therein. While this is normally a relatively straightforward operation, in some instances the temples have a spring member incorporated therein in order to permit flexing of the temple. The spring can either be in a state of compression or extension. In both cases, it becomes much more difficult to place the apertures in registry and retain them in this position while inserting the screw, especially considering the small size of the screws. To date, this has required a great deal of manual dexterity on the part of the optician or optometrist doing the repair.

Another problem associated with eye glasses is that various portions of the frame and/or temple tend to become bent over a period of time. Attempts to straighten these components can often lead to breakage if sufficient care is not taken. One particular weak point is where the end piece joins the main frame portion. Breakage here normally cannot be repaired.

It is an object of the present invention to provide a multi purpose tool to assist in the repair and adjustment of eye glasses.

It is a further object of the present invention to provide a tool adapted to permit the attachment of spring loaded temples to the main body of the eye glasses.

According to one aspect of the present invention, there is provided a tool suitable for use in repairing eye glasses, the tool having a body portion, a thin wire like clamping member adapted to move into and out of a clamping relationship with the body portion, and means for retaining the clamping member in a clamped relationship with the body.

In greater detail, the body portion and the clamp member are designed such that the clamping member will retain a clamped portion in a desired position. The clamping member which operates in conjunction with the body must enter some relatively small areas and therefore must be sized accordingly. In a preferred embodiment, a wire or cable member is utilized although it will be understood that other suitable members, appropriately sized, could be used. For example, one could employ a moulded plastic. When a wire is used, preferably it has a diameter of less than 1 mm and more preferably less than 0.70 mm.

In the preferred embodiment, the clamping member forms a loop such that the portion to be clamped passes through the loop and when the clamping member is moved into a clamping relationship, it is securely held between the clamping member and the body. Other like configurations could be used particularly when the clamping member has a certain degree of rigidity—i.e. a generally J-shaped configuration is one alternative embodiment.

The device will include means for moving the clamping member into and out of a clamping relationship with the body and to this end, several different alternatives could be employed with a preferred one involving the use of a lever or arm which is pivotably mounted with respect to the body and which is suitably secured to the clamping member. Thus, a pivotable movement of the lever will function to move the clamping member into and out of the clamping relationship previously described. In connection with this lever or arm, there may be provided means for locking the clamping member in the desired position.

The device could be manufactured of various different materials with plastic being a preferred material from the point of view of ease of manufacture—i.e. the various components can be moulded and assembled.

Having thus generally described the invention, reference will be made to the accompanying drawings illustrating an embodiment thereof, in which.

Figure 15:
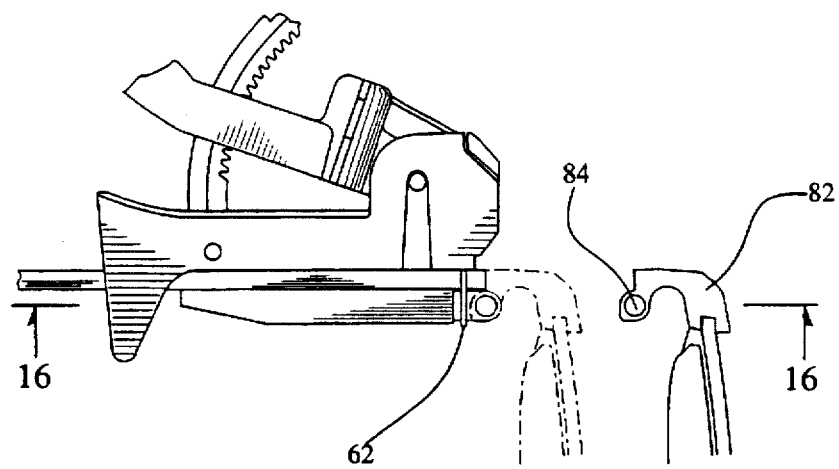
Figure 16:
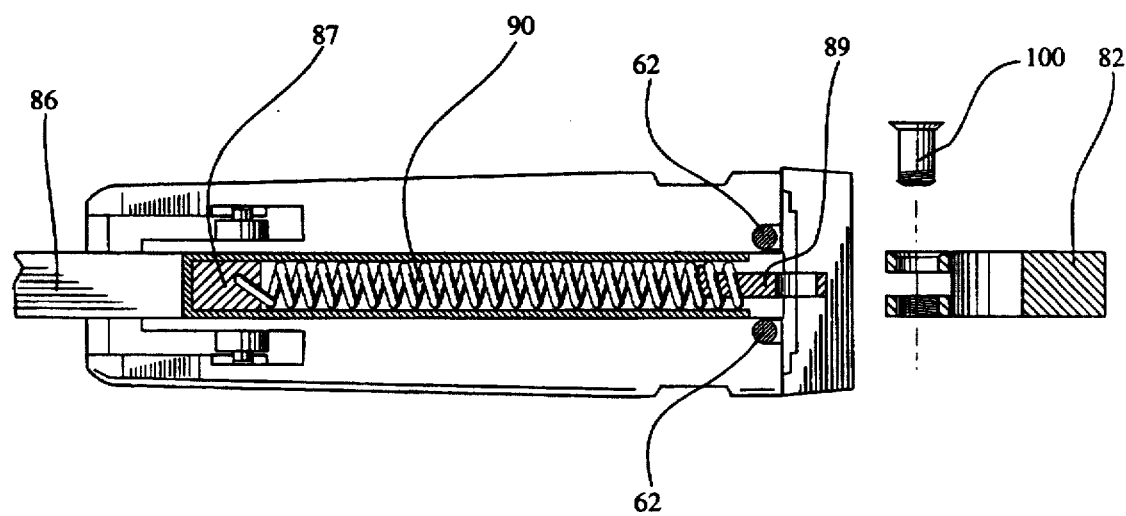
Figure 17:
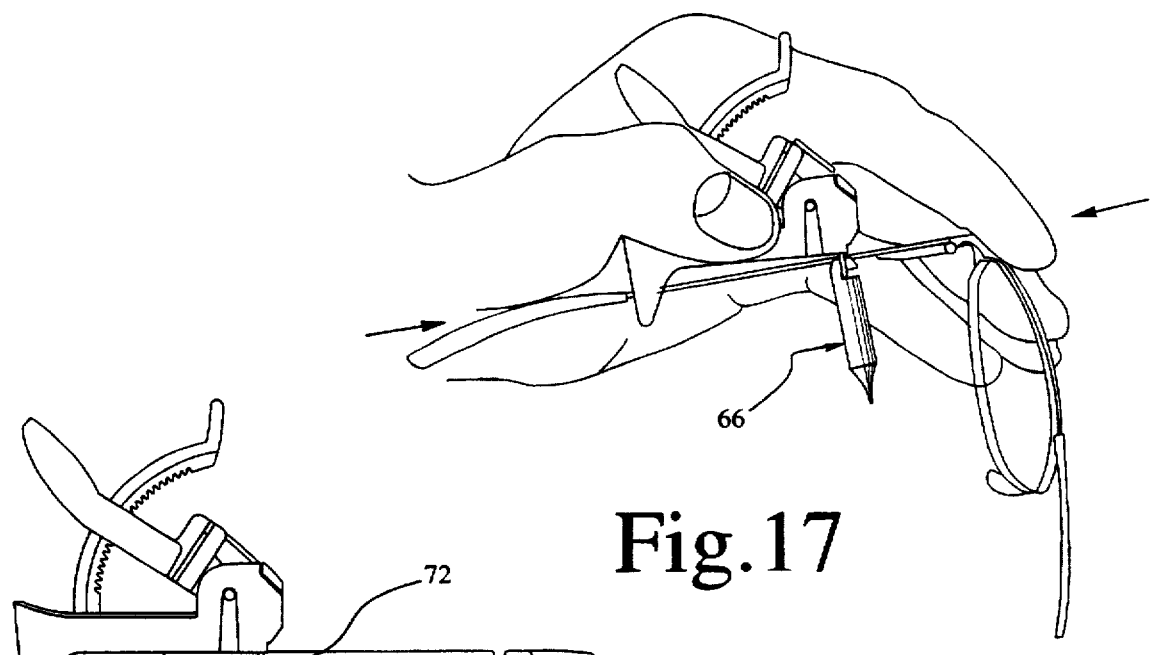
Figure 18:
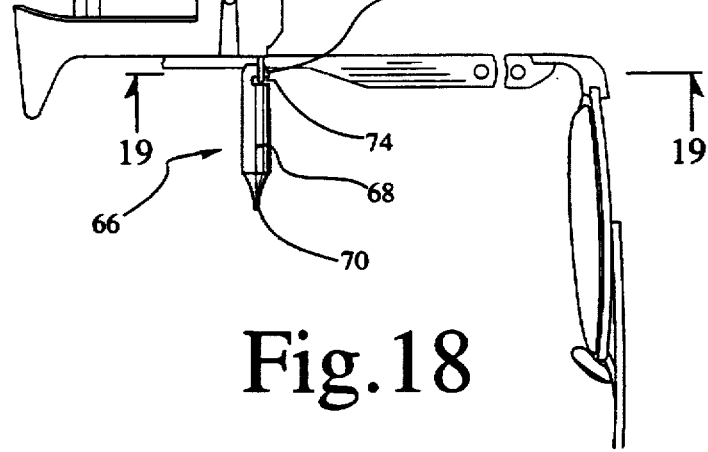
Figure 19:
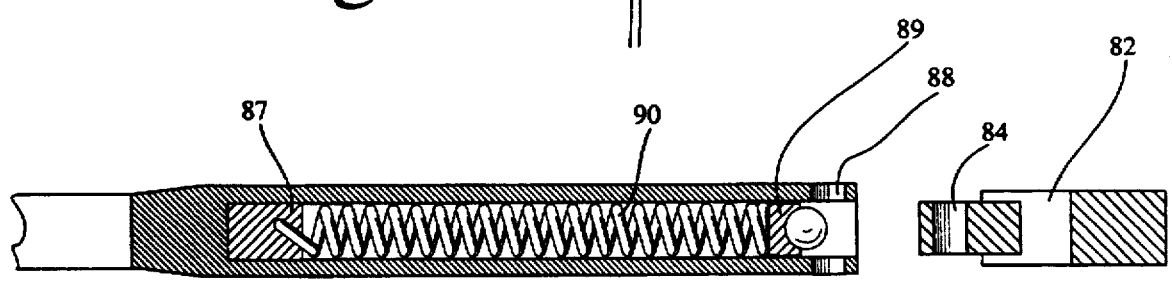
Figure 20:
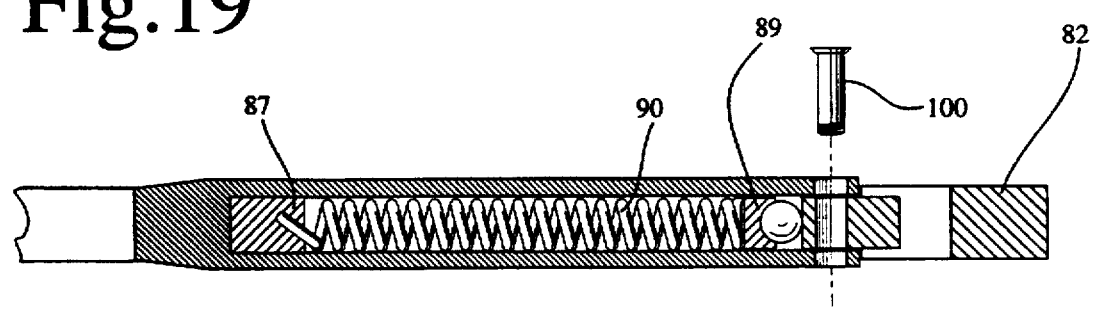
Figure 21:
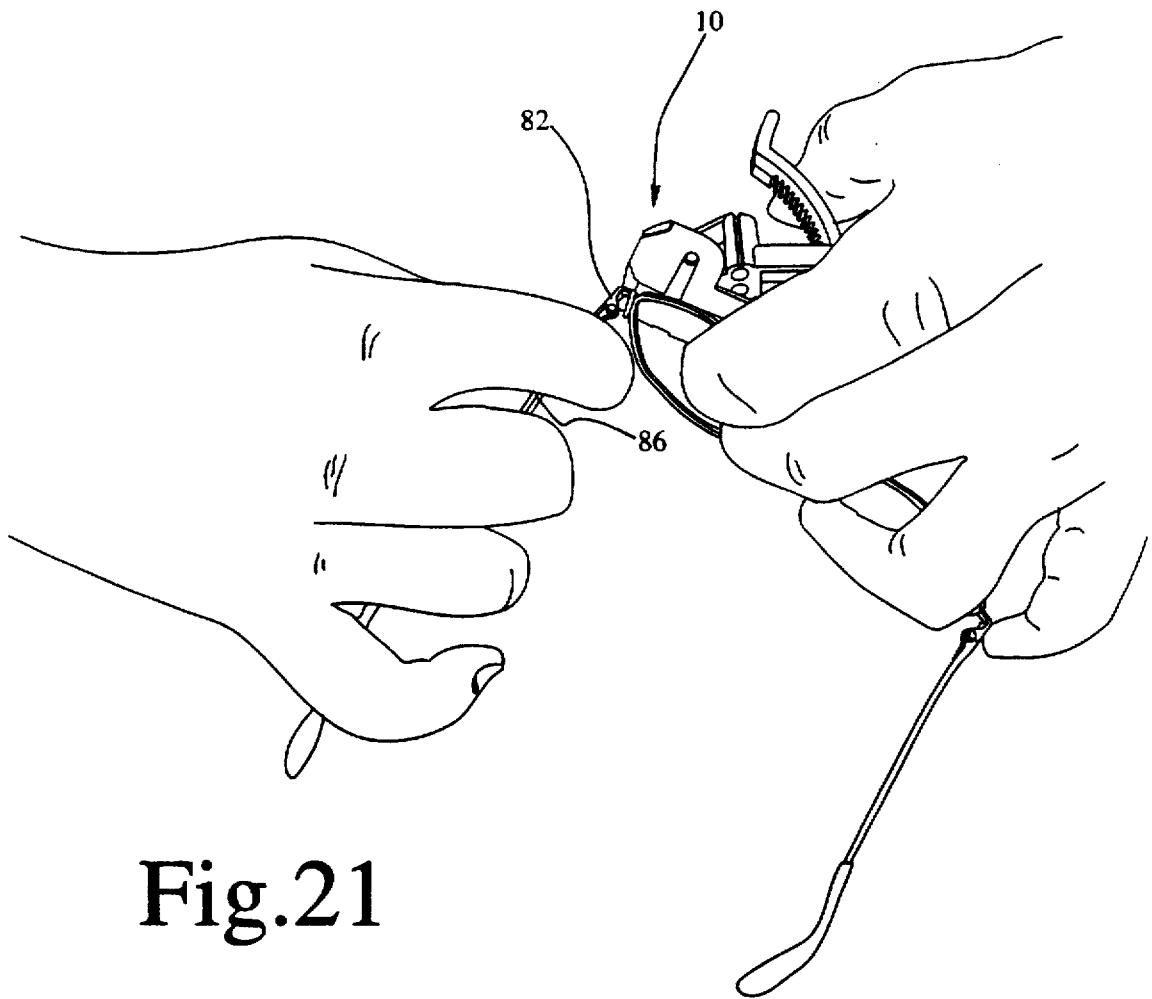
Figure 22:
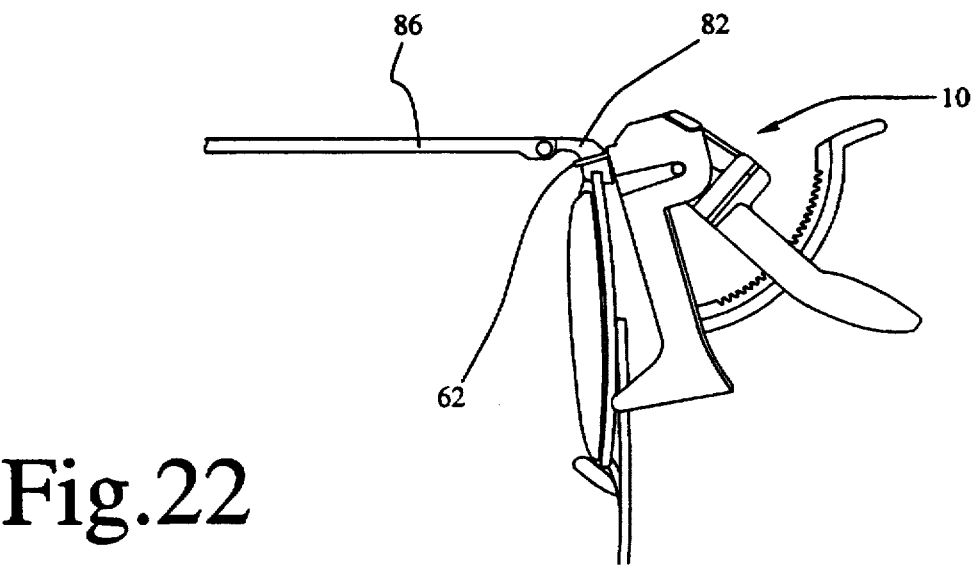
Figure 23:
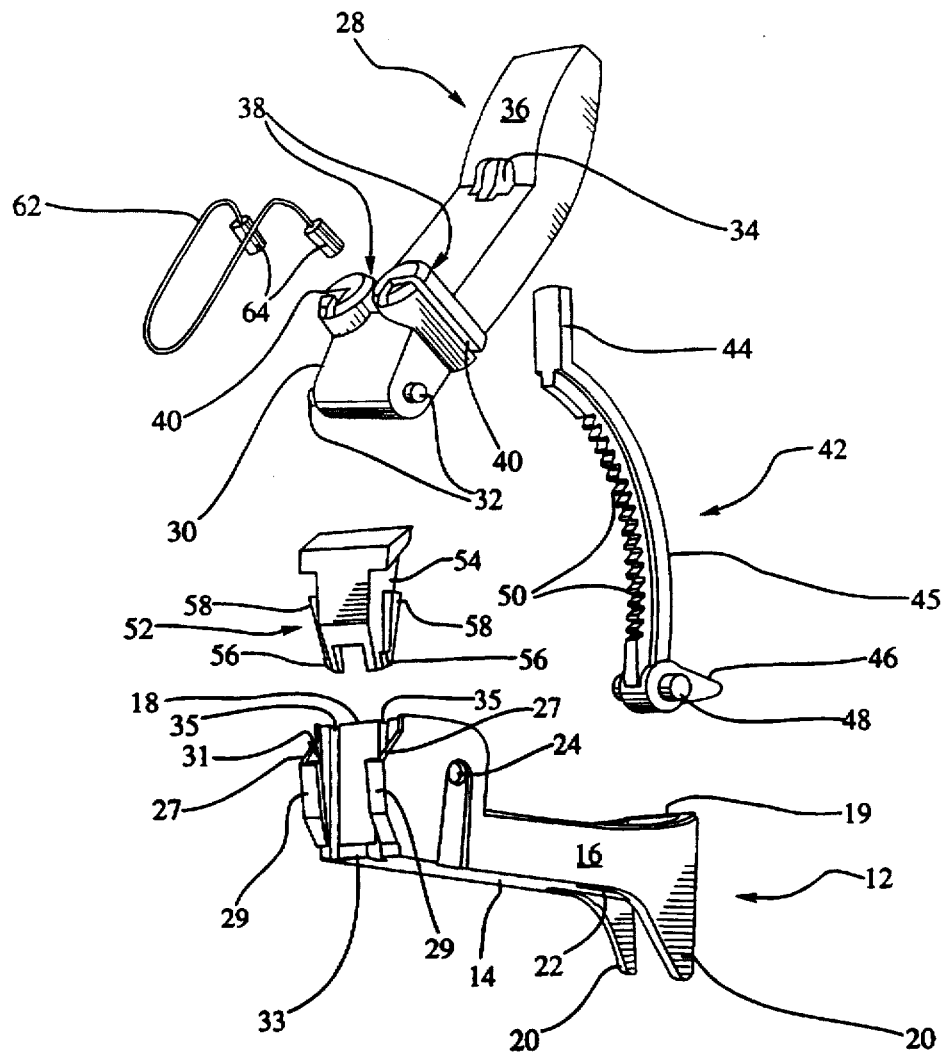

FIGS. 11, 12 13, 14, and 15 illustrate use of the tool when securing a temple to the eye glass frame;

FIG. 16 is a sectional view taken along the lines 16—16 of FIG. 15;

FIGS. 17 and 18 illustrate use of the tool in attaching a different type of temple to an eye glass frame;

FIG. 19 is a sectional view taken along the lines 19—19 of FIG. 18;

FIG. 20 is a sectional view similar to FIG. 19 illustrating use of the device; and FIGS. 21 and 22 illustrate use of the device in repair of a frame; and FIG. 23 is an exploded view of the device showing the individual components thereof.

Referring to the drawings in greater detail and by reference characters thereto, the tool or device of the present invention is generally designated by reference numeral 10 and includes a housing 12 having a base 14 with a pair of spaced apart parallel upwardly extending side walls 16. Extending between side walls 16 is a front wall 18 which is located slightly rearwardly of the forward edges of side walls 16. A rear wall 19 also extends between side walls 16. Tool 10 is symmetrical about its longitudinal plane.

Figure 2:
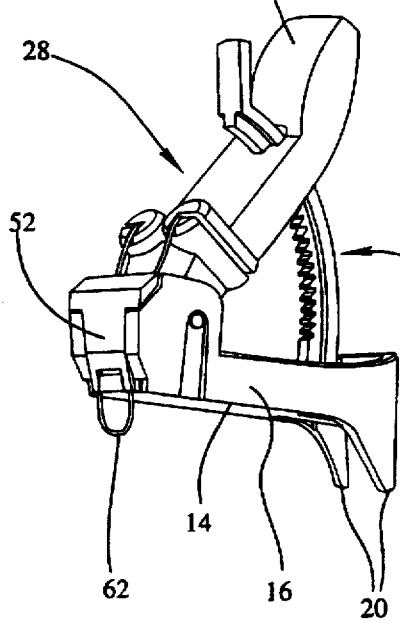
FIG. 2 is a perspective view of the tool.
Figure 3:
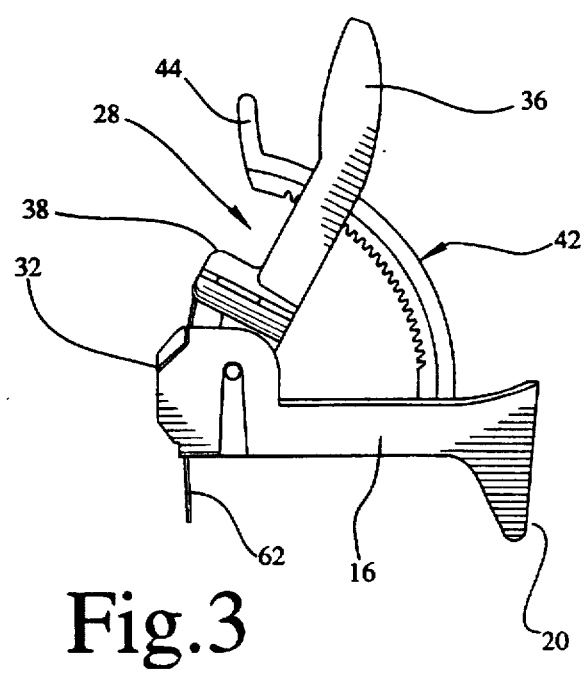
FIG. 3 is a side elevational view thereof.
Figure 4:
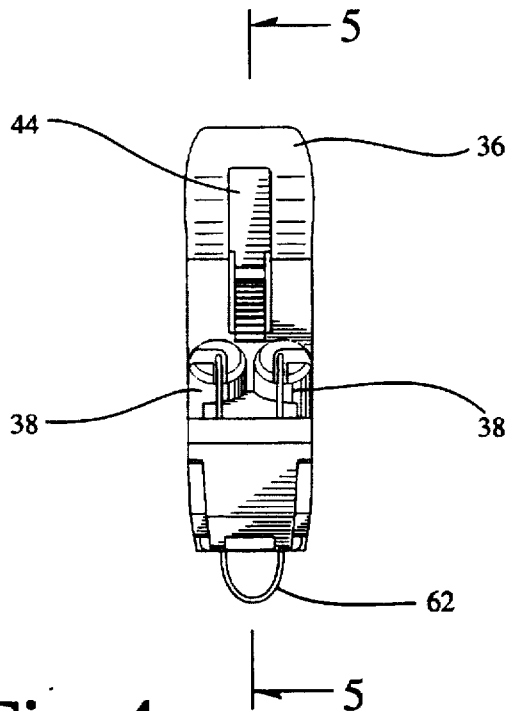
FIG. 4 is a front view thereof as seen from the left hand side of FIG. 3.
Figure 5:
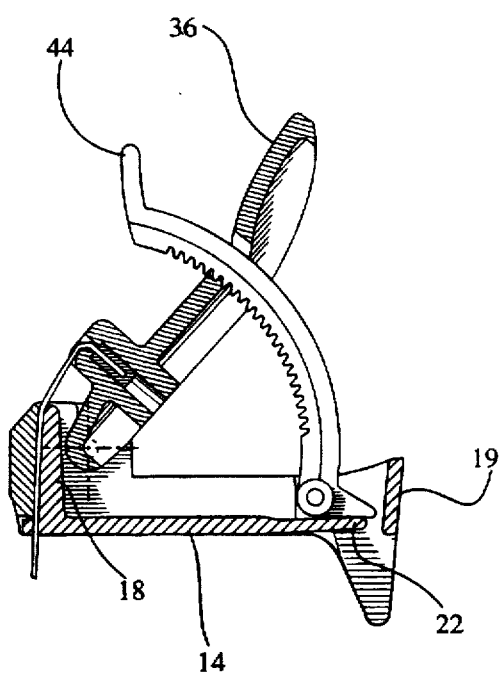
FIG. 5 is a sectional view taken along the lines 5—5 of FIG. 4.
Figure 7:
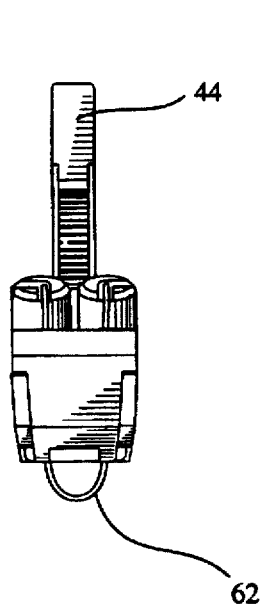
FIG. 7 is an end view seen from the left hand side of FIG. 6.
Figure 6:
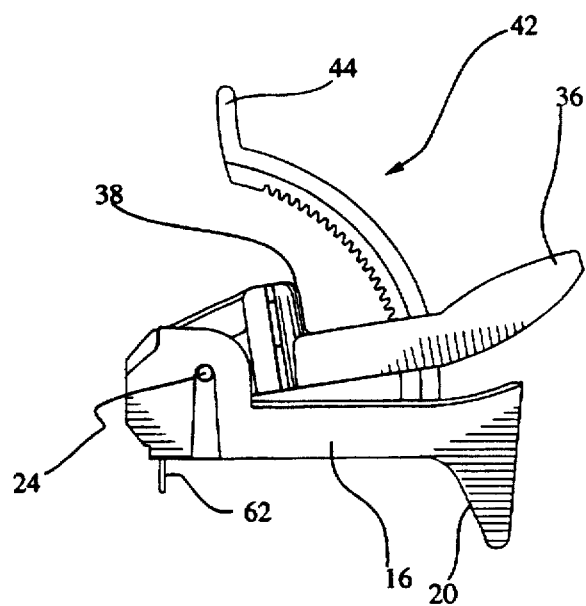
FIG. 6 is a side view similar to FIG. 3 illustrating the clamping member in a clamped position.
Figure 8:
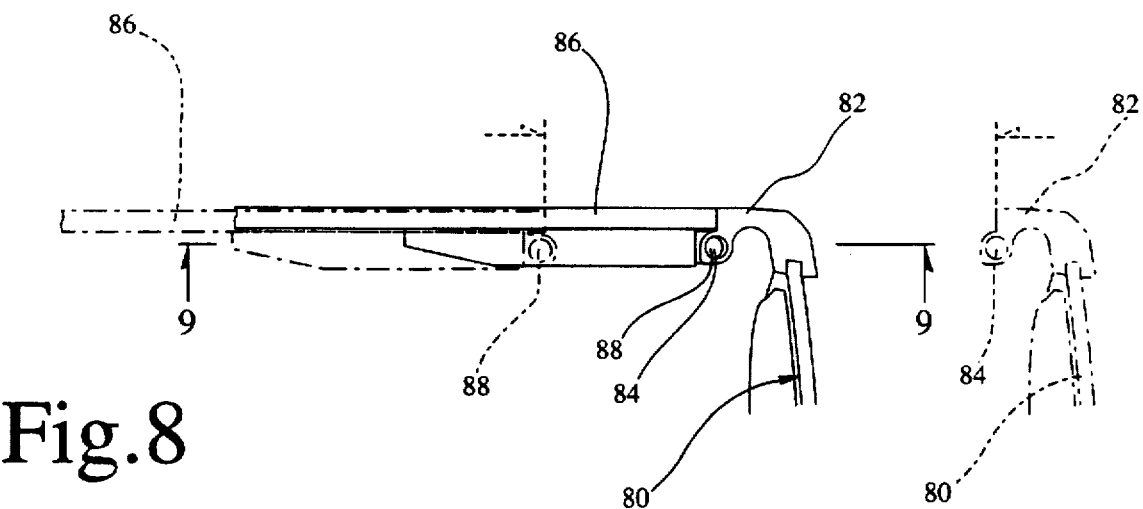
FIG. 8 is a top plan view illustrating the connection of an temple to the eye glass frame.

As may be seen in FIGS. 2 and 3, from each side wall 16 there is provided a downwardly extending flange 20 at the rearward portion of the side wall 16. It will be noted that bottom or base 14 does not extend all the way rearwardly between side walls 16; rather, there is a base tab 22 which is not connected to side walls 16.

As previously mentioned, side walls 16 extend forwardly of front wall 18 to form side wall extensions generally designated by reference numeral 27. Each side wall extension 27 in turn has an inwardly extending flange 29 to thereby define channels 31 between the forward face of front wall 18 and flanges 29. A stop member 33 extends outwardly from base 14 while front wall 18 has a pair of grooves 35 formed therein.

Side walls 16 also extend upwardly for a greater distance adjacent front wall 18. In the upwardly extending portion, each side wall has an aperture 24 formed therein. Also, side walls 16, at the rear portion thereof, have a recess (not shown) formed in each wall for reasons which will become apparent hereinafter.

A lever or arm 28 is adapted to be operatively mounted in housing 12 and to this end, lever 28 has a front end 30 which has a cylindrical stub shaft 32 extending outwardly from each side. An aperture 34 is provided in the middle of lever 28 between front end 30 and a thumb engaging portion 36. A pair of cylindrically shaped projections 38 extend upwardly from lever 28; each cylindrical projection 38 has a slot 40 extending its entire height and communicating with the interior of the cylindrical projections 38 which are hollow.

A ratch 42 has a curvilinear configurated body 45 with a first end having a tab 44 and the opposed end also terminating in a tab 46. Located proximate tab 46 on body 45 are outwardly extending stub shafts 48, one on each side. Body 45 of ratch 42 has a plurality of teeth 50 formed on one surface thereof.

A nose piece 52 has main body portion 54 with a pair of downwardly extending tabs 56 being formed at the bottom edge thereof. At each side of body 54 there is provided a flange 58 for reasons which will become apparent hereinafter.

The clamping member is a cable or wire 62 which has an enlarged portion 64 at each end thereof. Conveniently, enlarged portion 64 comprises a metal slug formed about the wire.

For some uses, as will be discussed hereinbelow, there may be provided an accessory device generally designated by reference numeral 66 (FIGS. 17 and 18) and which includes a generally cylindrical body 68 having a needle like projection 70 formed at one end thereof. At the opposed end, the body 68 has a concave surface 72. Adjacent concave surface 72 a radially directed slot 74 is formed.

As may be seen in the drawings, arm or lever 28 is placed into operative relationship with body or frame 12 by engaging shafts 32 within apertures 24 such that arm 28 can move pivotably with respect to body 12. Wire 62 is then inserted through slots 40 in cylindrical projections 38. The enlarged portions 64 seat within the hollow portion of cylindrical projections 38 to prevent removal of wire 62. Wire 62 is then placed within channels 31 formed in front wall 18 and nose piece 52 is then frictionally engaged with front wall 18 with flanges 58 fitting within channels 31. Downwardly extending tabs 56 extend on either side of stop 33.

Subsequently, ratch 42 is inserted such that shafts 48 engage within the recesses formed within side walls 16 such that it can move pivotably. Tab 46 is adapted to seat on base tab 22 while the body portion 45 extends through aperture 34 with the teeth 50 being adapted to engage a wall of arm 28.

Thus, as will be seen, in operation the pivotable movement of arm 28 by means of thumb engaging portion 36 will cause wire 62 to move into and out of a clamping relationship with base 14 of body 12. The seating of tab 46 on base tab 22 resiliently biases ratch 42.

The device can be used for a number of different repairs as shown in the drawings.

Thus, referring to FIGS. 8 to 16, there is illustrated a method of attaching a temple to the main frame of an eye glass. Thus, as shown in the drawings, an eye glass frame 80 has a end piece 82 which has an aperture 84 formed therein. A temple 86 is adapted to be mounted to end piece 82. In this instance, temple 86 is of the type having an internal spring 90 in a state of tension with one end of spring 90 being held by element 87 and the other end secured to moveable member 89. Member 89 has an aperture 88 formed therein.

Figure 1:
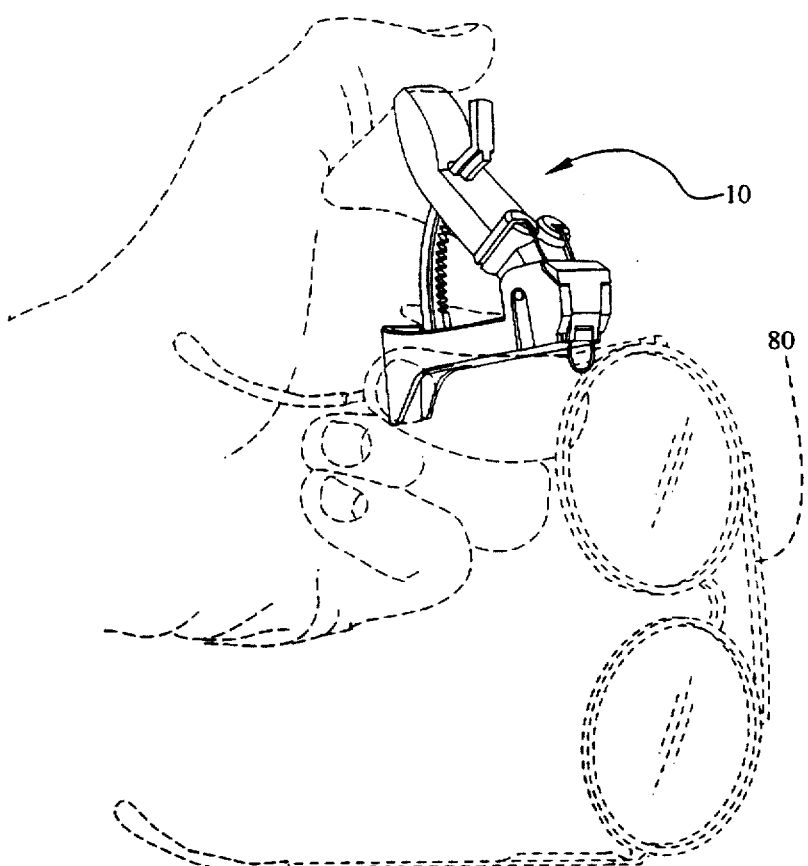
FIG. 1 is a perspective view illustrating one use of the tool in the repair of eye glasses.
Figure 9:
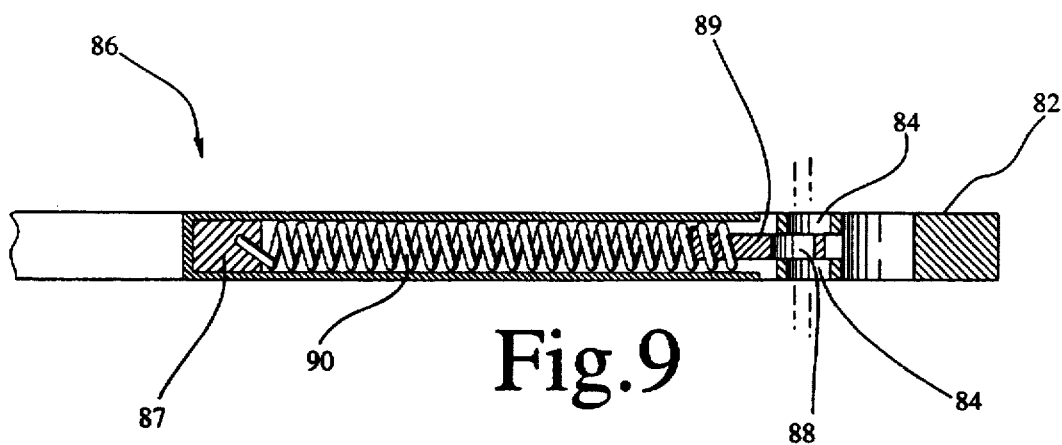
FIG. 9 is a sectional view taken along the lines 9—9 of FIG. 8.
Figure 10:
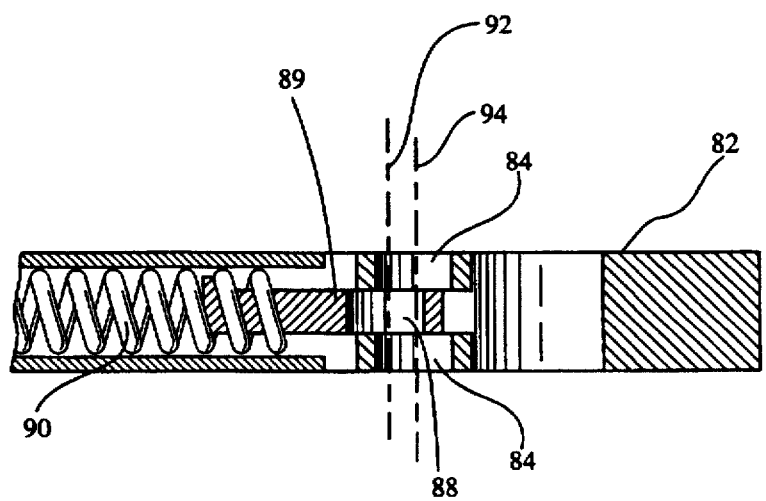
FIG. 10 is an enlarged view illustrating registry of the apertures in FIG. 9.
Figure 11:
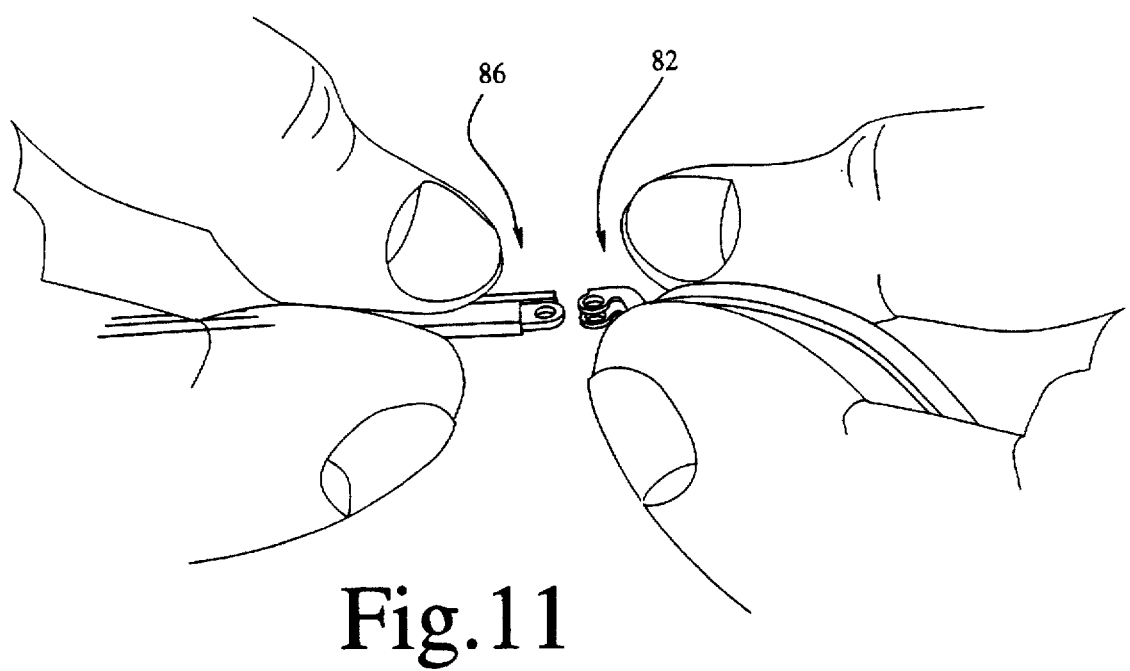
Figure 12:
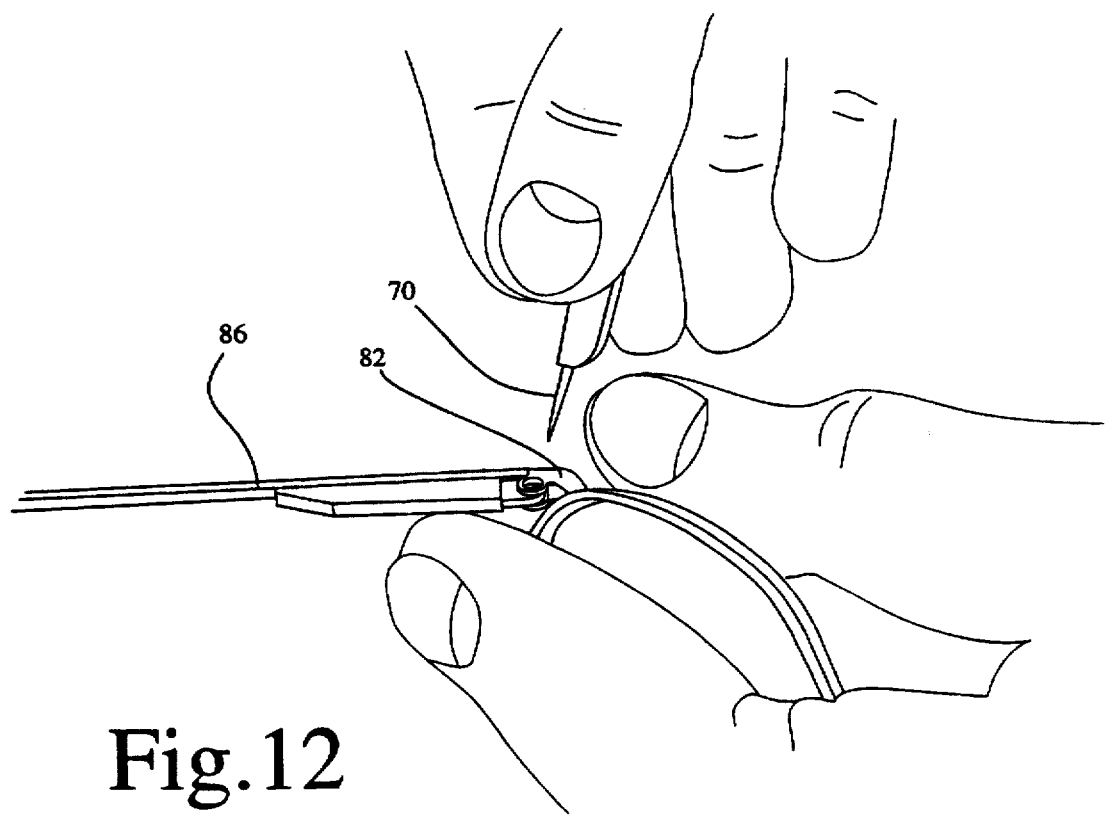
Figure 13:
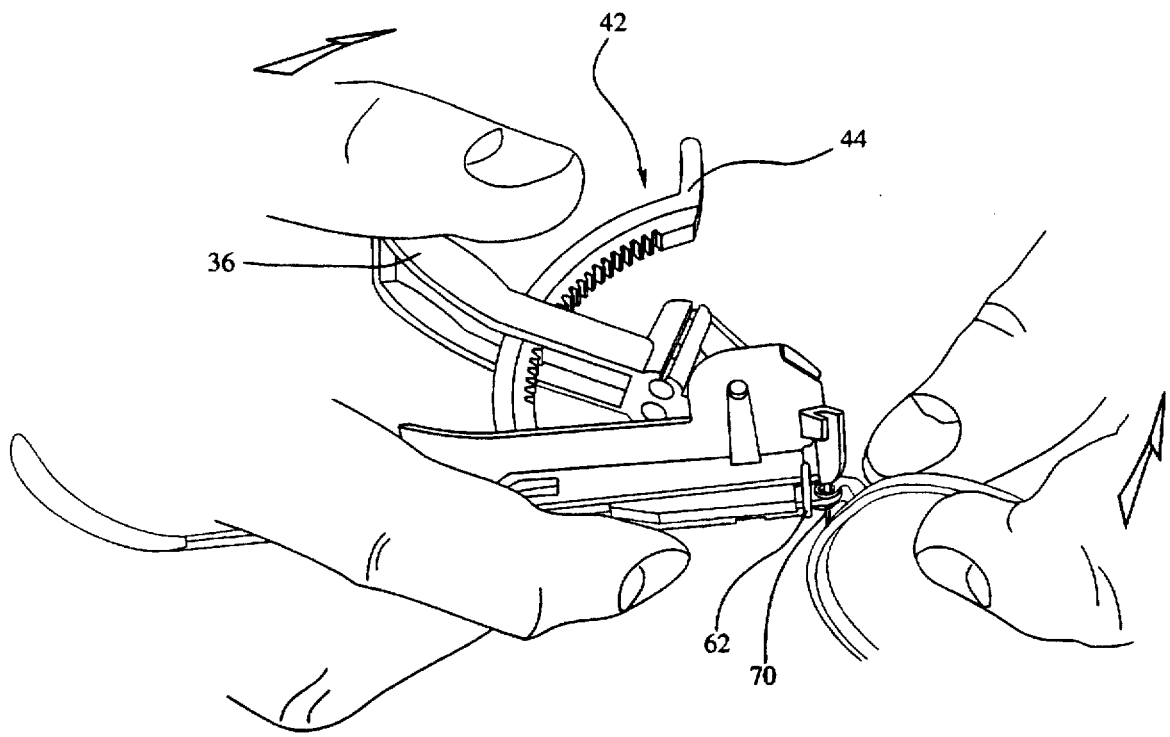
Figure 14:
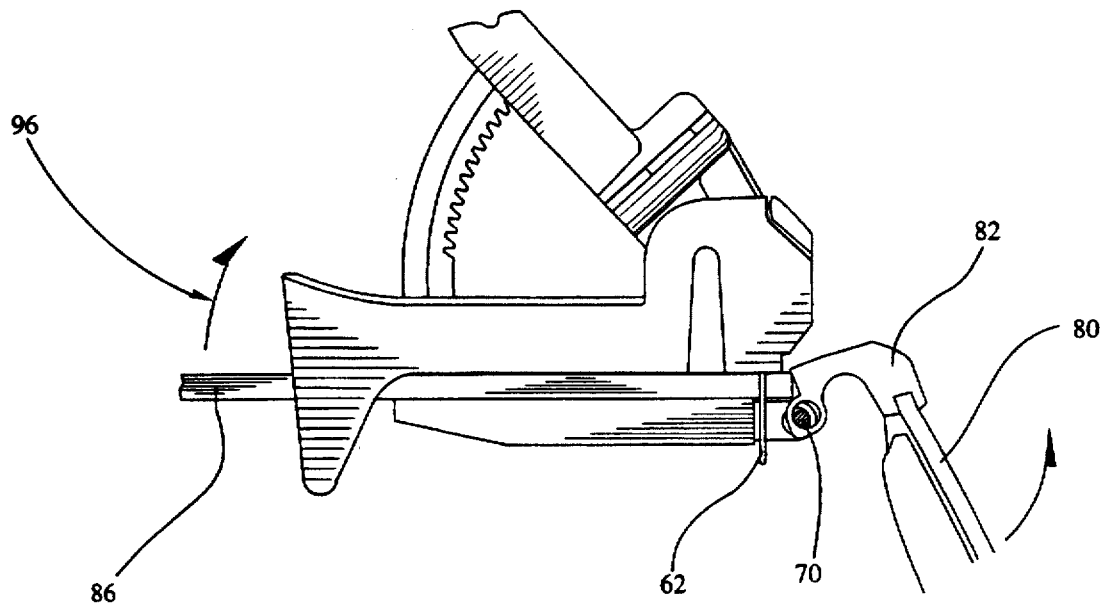

Alignment of apertures 84 and 88 is prevented under normal conditions as shown by the differences in the center lines 92 and 94 of apertures 88 and 84 respectively as shown in FIGS. 9 and 10. As illustrated in FIGS. 11 and 12, a first step involves the insertion of a device to keep apertures 84 and 88 aligned. Conveniently, the needle like projection 70 of accessory 66 may be utilized. Subsequently, device 10 is placed in position by threading temple 86 through the loop formed by wire 62 as shown in FIGS. 1 and 13. Arm 28 is then moved as illustrated by arrow 96 in FIG. 14 to move member 89 into an extended position. Subsequently, wire 62 is moved into a clamping position to retain member 89 in the extended position (FIGS. 15 and 16). One may then remove accessory 66 and with member 89 being in its extended position, a screw 100 may then be inserted.

A further use is illustrated in FIGS. 17 to 20. In this embodiment, spring member 90 is in a state of compression. To assist in placing temple 86 on end piece 82, temple 86 is again threaded into position but with accessory 66 also being used. As shown, accessory 66 is also utilized with wire 62 extending through slot 74 such that concave surface 72 is in contact with one side of the temple. In this instance temple 86 must be pushed into alignment with end piece 82. Normally the ability to do so is limited due to the somewhat fragile characteristics of temple 86. However the use of tool 18 provides a solid gripping area and permits the alignment of apertures 88 and 84 without risk of bending temple 86.

A further use is illustrated in FIGS. 21 and 22 wherein clamping wire 62 is placed in a clamping relationship with end piece 82. One can then apply a bending force to the end piece to adjust the same in cases of where it has become misaligned. Normally, due to fear of breakage, the end piece is left misaligned and adjustments have to be made by bending the temple.

It will be understood that the above described embodiments are for purposes of illustration only and that changes and modifications may be made thereto without departing from the spirit and scope of the invention.

I claim:

1. A hand tool, for use in repairing eye glasses, said tool comprising a body portion (16), a thin flexible wire clamping member (62) adapted to move into and out of a clamping relationship with said body portion (16), an arm (28) pivotably mounted with respect to said body portion (16), said arm (28) having said clamping member (62) associated therewith such that pivotable movement of said arm (28) will cause said clamping member (62) to move into and out of the clamping relationship with the body portion (16), and means (42) for retaining said clamping member (62) in a clamped relationship with said body portion (16), said means comprising a toothed member adapted to engage said arm in a ratchet like relationship.

2. The tool of claim 1 wherein said thin flexible wire clamping member (62) has a diameter of less than 1 mm.

3. The tool of claim 2 wherein said body portion (16) has a substantially flat surface (14).

4. The tool of claim 1 wherein said toothed member is resiliently biased.

5. The tool of claim 2 wherein said thin flexible wire clamping member (62) forms a loop.

6. The tool of claim 1 wherein said body portion (16) has flanges (20) extending outwardly therefrom to form a flat surface (14) to define a channel.

7. The tool of claim 2 further including an accessory device (66) having a slot (74) adapted to receive said clamping member, a surface (72) adjacent said slot (74) such that said accessory (66) can be held in a clamping relationship with the body (16).

* * * * *